United States Patent [19]

Umeno et al.

[11] Patent Number: 5,790,139
[45] Date of Patent: Aug. 4, 1998

[54] INK JET PRINTING APPARATUS WHICH UTILIZES DIFFERENT VOLTAGES APPLIED TO DIFFERENT GROUPS OF EJECTING MEMBERS IN ACCORDANCE WITH IMAGE DATA

[75] Inventors: Koji Umeno; Eiichi Tone; Yuki Ito; Yoshiko Uriu, all of Osaka, Japan

[73] Assignee: Mita Industrial Co., Ltd., Osaka, Japan

[21] Appl. No.: 566,881

[22] Filed: Dec. 4, 1995

[30] Foreign Application Priority Data

Dec. 26, 1994 [JP] Japan ................................ 6-322264

[51] Int. Cl.$^6$ ................................ B41J 2/045; B41J 2/205
[52] U.S. Cl. ................................ 347/10; 347/12; 347/15; 347/6; 347/70
[58] Field of Search ................................ 347/10, 12, 15, 347/9, 11, 70

[56] References Cited

U.S. PATENT DOCUMENTS

4,189,734  2/1980  Kyser et al. ................................ 346/1.1
4,463,359  7/1984  Ayata et a. ................................ 346/1.1

Primary Examiner—Benjamin R. Fuller
Assistant Examiner—Christina Annick
Attorney, Agent, or Firm—Jordan and Hamburg

[57] ABSTRACT

An ink ejecting device includes an ink ejecting member having an ink chamber and a nozzle at a specified position thereof; an ink ejecting driver for reducing the volume of the ink chamber to eject out ink from the ink chamber through the nozzle; and a controller connectable to an image data generator generating image data indicative of a plurality of densities for controlling the ink ejecting driver to regulate the volume reduction of the ink ejecting chamber in accordance with image data. Ink is ejected at an amount corresponding to image data indicative of a density. An image having a gradation can be printed at a high speed accurately and clearly with a simplified construction.

6 Claims, 9 Drawing Sheets

INK JET PRINTING APPARATUS WHICH UTILIZES DIFFERENT VOLTAGES APPLIED TO DIFFERENT GROUPS OF EJECTING MEMBERS IN ACCORDANCE WITH IMAGE DATA

BACKGROUND OF THE INVENTION

This invention relates to an ink ejecting device, and more particularly to an ink ejecting device for use in an ink jet printing apparatus such as a facsimile machine, a copying machine, and a printer.

Conventionally, there is known an ink jet printing apparatus including a printing head incorporating an ink ejecting device having a number of nozzles and piezoelectric conversion elements corresponding to the nozzles. Ink is ejected out from each nozzle by deformation of the corresponding piezoelectric conversion element.

An image having a gradation is printed by using such ink ejecting device as follows. For example, in the case of using a printing head having a nozzle arrangement in a matrix of 50 rows and 50 columns, i.e., a total of 250 nozzles, when an image having a high density is printed, a predetermined number of nozzles which are necessary to print the image in a proper resolution, e.g., 150 nozzles, are wholly used to print the image. On the other hand, when an image having a low density is printed, a specified number of nozzles, e.g., 100 nozzles, which is smaller than the number of nozzles necessary for the proper resolution of the image (i.e., 150 nozzles) are used to print the image. In other words, the number of used nozzles for the image having the low density is smaller compared to the predetermined number of used nozzles for the image having the high density, and hence an interval of ink ejecting becomes larger.

The above printing method suffers the following drawbacks. The number of nozzles for ink ejecting is decreased when an image having the lower density is printed, compared to the number of nozzles necessary to properly print the image having the higher density. As a result, the resolution of printed image is deteriorated, and an outline of the printed image becomes blurred. Accordingly, in the case where such an image is printed with the conventional ink ejecting device, the image cannot be printed accurately and clearly in accordance with image data.

Further, there is the necessity of a controller to control the selection of nozzles for various image densities, which makes the construction of conventional ink ejecting devices complicated.

In view thereof, a need exists for an ink jet printing apparatus having an ink ejecting device which can control a gradation easily and can print an image having a plurality of densities accurately and clearly without deteriorating the image resolution even in the case where the density is lower.

SUMMARY OF THE INVENTION

It is an object of the present invention to provide an ink ejecting device which overcomes the problems residing in the prior art.

It is another object of the present invention to provide an ink ejecting device which makes it possible to control image gradation easily and accurately, and to assure a clear printed image having a plurality of densities.

It is yet another object of the present invention to provide an ink ejecting device which has a simplified construction and is capable of printing an image having a plurality of densities at a higher rate of response.

An ink ejecting device of the present invention comprising: an ink ejecting member having an ink chamber for accommodating ink and a nozzle formed at a specified position thereof; an ink ejecting driver which reduces the volume of the ink chamber to eject ink out from the ink chamber through the nozzle; and a controller which is connectable to an image data generator for generating image data indicative of one of a plurality of densities, and controls the ink ejecting driver to regulate the volume reduction of the ink chamber in accordance with image data.

The ink ejecting driver may be constructed by a resilient member constituting a part of a wall of the ink chamber; and a deformation member attached to the resilient member for deforming the resilient member.

The deformation member may be constructed as a piezoelectric conversion element which is deformable in accordance with voltages. Also, the controller may be provided with a drive voltage generator which generates cyclically a plurality of different drive voltages corresponding to the plurality of densities in a predetermined order; and a drive voltage applicator which selectively applies drive voltages to the piezoelectric conversion element in accordance with image data.

The ink ejecting device may be provided with a plurality of ink ejecting members. The drive voltage applicator may be made to apply the same voltage to a given number of ink ejecting members to eject the same amount of ink from the given number of ink ejecting members at the same time.

The plurality of ink ejecting members may be divided into at least two groups, and the drive voltage applicator may be made to apply a first drive voltage, to the piezoelectric conversion elements in one group while applying a second drive voltage, different from the first drive voltage to the piezoelectric conversion elements in the other group.

The drive voltage generator may generate a drive voltage having a ripple voltage component.

It may be appreciated to use the ink ejecting device as a printing head of an ink jet printing apparatus.

With the ink ejecting device, the ink ejecting driver reduces the volume of the ink chamber containing ink to eject ink from the chamber. The reduction of volume is controlled in accordance with image data. In other words, the ejecting amount of ink can be controlled merely by changing the reduction of volume of the ink ejecting chamber. This will make it possible to accurately print an image having a gradation of a plurality of densities at a high speed. Also, ink ejection is accomplished by a simpler construction.

The ink ejecting driver is provided with the resilient member constituting a part of the wall of the ink chamber and the resilient member deformation member. A part of the wall of the ink ejecting chamber is deformed to thereby eject ink from the ink chamber. Accordingly, a quick response in ink ejection can be assured, and an image having gradations is printed more accurately.

The deformation member is constructed using a piezoelectric conversion element. The deformation member produces an ejection force in response to an electric signal. Accordingly, ink ejection is performed responsively and accurately.

A specified number of ink ejecting members are driven at the same voltage and at the same time. Accordingly, a large image area is to be printed in a reduced time, and hence the image printing speed can increase.

The plurality of ink ejecting members are divided into at least two groups. Different voltages are applied to the ink ejecting member groups at the same time. In other words, their respective maximum voltages are not applied to the ink ejecting members of the groups at the same time. Accordingly, the instantaneous power consumption can be kept at a lower level.

Further, the drive voltage generator generates a drive voltage having a ripple voltage component. Accordingly, an end portion or meniscus of ink in the ink chamber is vibrated at a fixed interval. This makes it possible to increase the ink ejection frequency, thereby assuring a high speed printing The ink ejecting device is used as a printing head of the ink jet printing apparatus, which consequently enables production of an ink jet printing apparatus capable of accurately printing an image having a gradation at a high speed.

The above and other objects, features and advantages of the present invention will become more apparent upon a reading of the following detailed description and drawings.

DETAILED DESCRIPTION OF THE PREFERRED EMBODIMENTS OF THE INVENTION

A first ink ejecting device of the present invention will be described with reference to FIGS. 1A to 5. In this embodiment, the ink ejecting device is used in an ink jet printing apparatus. The ink ejecting device is provided with a specified number of nozzles. Ink is ejected from each nozzle of the ink ejecting device in accordance with image data outputted from an unillustrated image data generator to print an image on a sheet of printing paper.

Figure 1A:
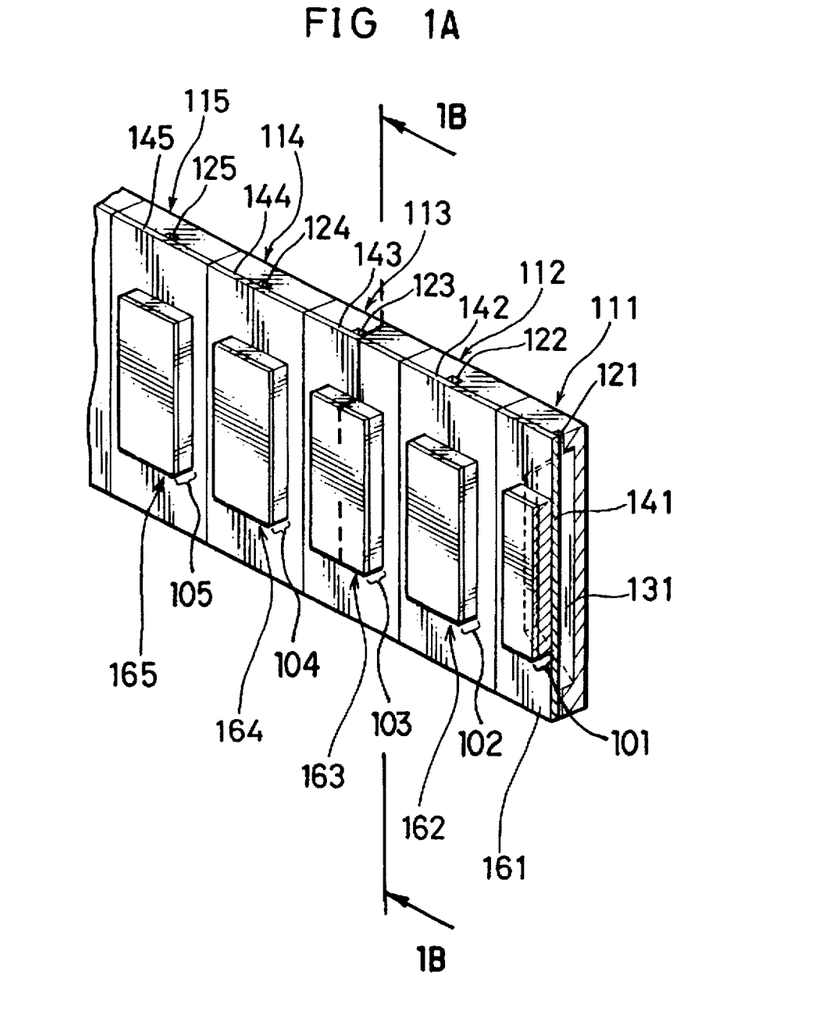
FIG. 1A is a partially cut-away perspective view showing a construction of a first ink ejecting device embodying the present invention.
Figure 1B:
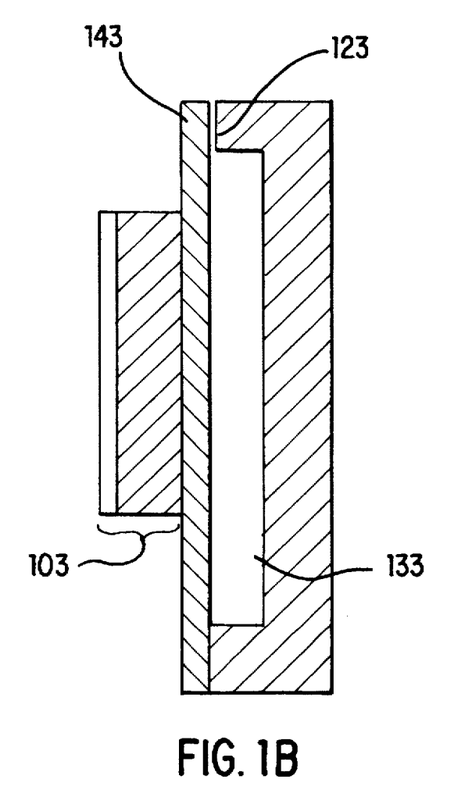
FIG. 1B is a cross-sectional view of the ink ejecting device of FIG. 1A taken along line 1B—1B.
Figure 2:
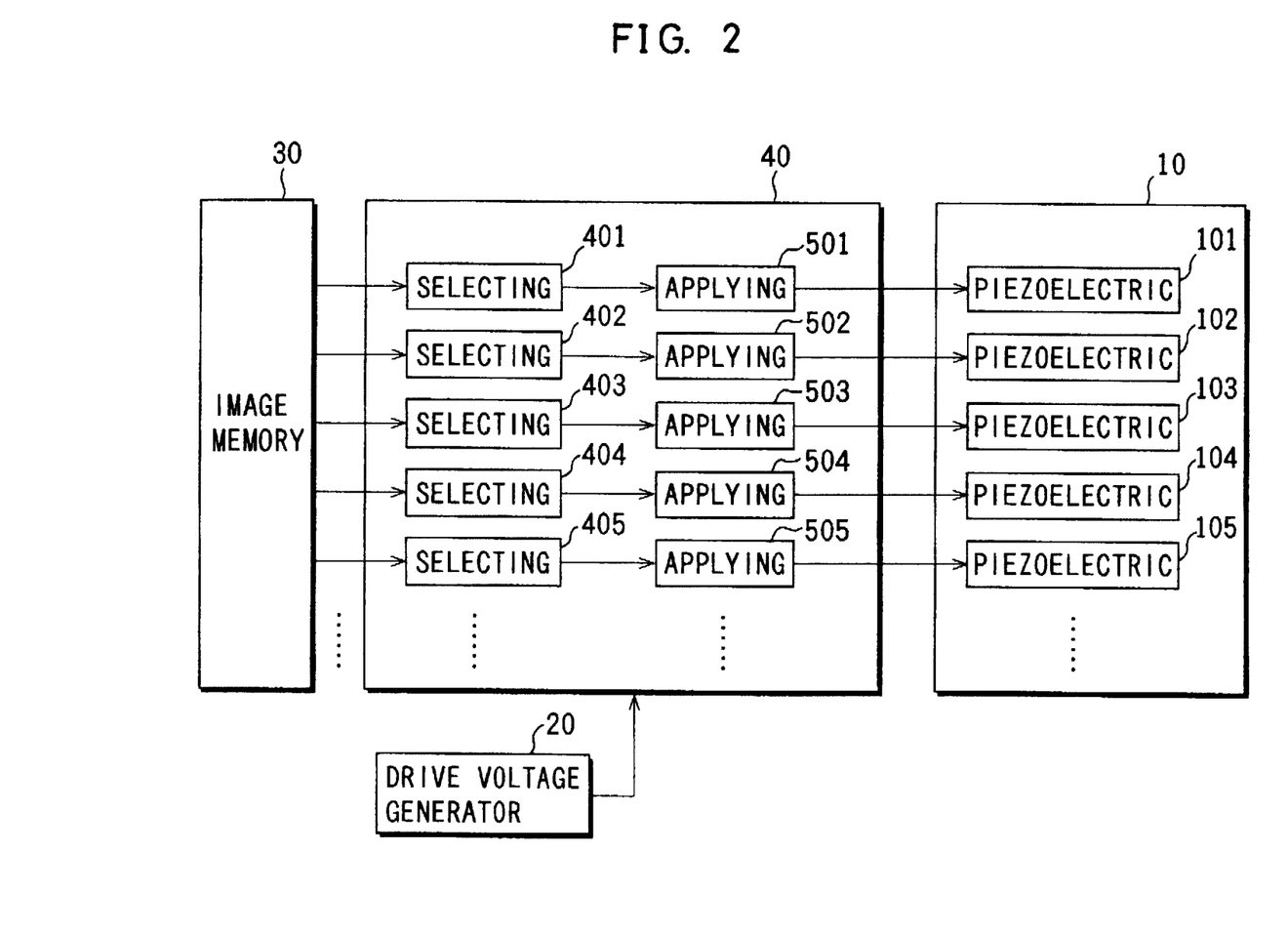
FIG. 2 is a block diagram showing a construction of an ink jet printing apparatus incorporating the first ink ejecting device.

As shown in FIG. 2, the ink ejecting device includes a printing head 10, a drive voltage generator 20, and an ink ejecting drive circuit 40.

The printing head 10 includes a specified number of ink ejecting portions 111, 112, 113, 114, 115, ... The ink ejecting portions are arranged in an array at equal intervals. The ink ejecting portions 111, 112, 113, 114, 115 ... are formed with nozzles 121, 122, 123, 124, 125, ... and also have ink chambers 131, 132, 133, 134, 135, ... at an appropriate position, respectively. The ink chambers 131, 132, 133, 134, 135, ... are formed with resilient walls 141, 142, 143, 144, 145, ... at an appropriate position respectively to vary the volume of the corresponding ink chamber. The resilient walls 141, 142, 143, 144, 145, ... are formed of a resilient material and provided with piezoelectric conversion elements (deforming means for deforming the resilient wall) 101, 102, 103, 104, 105, ..... respectively. The resilient wall is flexed by the corresponding piezoelectric conversion element to thereby vary the volume of the corresponding ink chamber. The piezoelectric conversion elements 101, 102, 103, 104, 105 ... and the resilient walls 141, 142, 143, 144, 145, ... constitute ink ejecting drive portions 161, 162, 163, 164, 165, ..., respectively.

The piezoelectric conversion element is activated in accordance with a voltage applied thereto (hereafter referred to as a "drive voltage") to deform the resilient wall inward. The inward deformation of the resilient wall reduces the volume of the corresponding ink chamber and thereby ejects out ink. Ink ejection is controlled by controllably varying the drive voltage to the piezoelectric conversion element.

In this embodiment, image data has four density levels, i.e., first to fourth density levels. For the first density level, a large amount of ink is ejected; for the second density level, an intermediate amount of ink is ejected; for the third density level, a small amount of ink is ejected; and for the fourth level, no ink is ejected.

In this embodiment, a so-called "drop-down-and-raise-up" voltage driving manner is adopted as a manner for activating the piezoelectric conversion element. In this manner, a specified level of bias voltage is constantly applied to the piezoelectric conversion element to keep the ink chamber in a pressurized state. Immediately before ink ejection, the applied voltage is temporarily dropped down to temporarily reduce the pressure of the ink chamber. Thereafter, a specified magnitude of drive voltage is applied to the piezoelectric conversion element to raise the pressure of the ink chamber again, thereby ejecting ink from the ink chamber through the corresponding nozzle.

Figure 3:
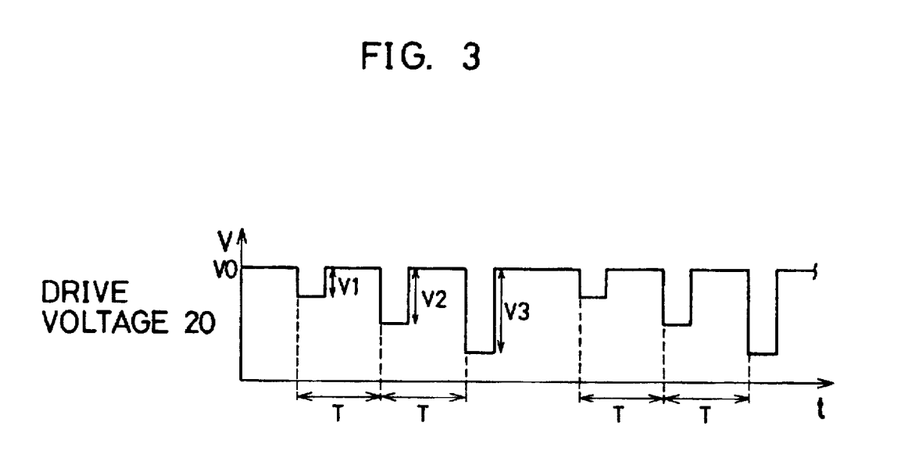
FIG. 3 is a diagram showing a waveform of a voltage signal sent from a drive voltage generator of the first ink ejecting device.

The drive voltage generator 20 is adapted for generating a drive voltage signal for the respective piezoelectric conversion elements. As shown in FIG. 3, drive voltages V1, V2, V3 (V1<V2<V3) are repeatedly generated at a specified time interval T in this order.

The image memory 30 stores image data in the form of a plurality of bits, e.g., eight bits output from an external device such as a personal computer (image data generator). The image data has information on the image density. The image data is output to the ink ejecting drive circuit 40 at the interval of generating the set of drive voltages V1, V2, and V3 in the drive voltage generator 20. Alternatively, image data read by an image reader including a CCD (Charge Coupled Device) may be sent to the image memory 30.

The ink ejecting drive circuit 40 (applying means for applying a drive voltage to the piezoelectric conversion element) comprises application timing selecting portions 401, 402, 403, 404, 405, ... and drive voltage applying portions 501, 502, 503, 504, 505, ...., each of which correspond to the piezoelectric conversion elements 101, 102, 103, 104, 105 ... arranged in the corresponding nozzles. For example, the application timing selecting portion 401 and the drive voltage applying portion 501 correspond to the piezoelectric conversion element 101. The application timing selecting portion 402 and the drive voltage applying portion 502 correspond to the piezoelectric conversion element 102. The ink ejecting drive circuit 40 outputs the drive voltage to the piezoelectric conversion elements in accordance with image data.

The application timing selecting portion selects an application timing for a specified drive voltage in accordance with image data from the image memory 30. The drive voltage applying portion constantly applies a bias voltage V0 generated in the drive voltage generator 20 to the corresponding piezoelectric conversion element. At the selected application timing for one of the drive voltages V1 to V3, the drive voltage applying portion executes the application of drive voltage, thereby applying a selected drive voltage to the corresponding piezoelectric conversion element.

For example, in the case where the small amount of ink is ejected, i.e., image data designates the third density level, an application timing for the drive voltage V1 is selected to apply the drive voltage V1 to the corresponding piezoelectric conversion element. In the case where the intermediate amount of ink is ejected, i.e., image designates the second density level, an application timing for the drive voltage V2 is selected to apply the drive voltage V2 to the corresponding piezoelectric conversion element. In the case where the large amount of ink is ejected, i.e., image data designates the first density level, an application timing for the drive voltage V3 is selected to apply the drive voltage V3 to the corresponding piezoelectric conversion element. In the case where no amount of ink is ejected, i.e., image data designates the fourth density level, no drive voltage is applied to the corresponding piezoelectric conversion element.

Figure 4:
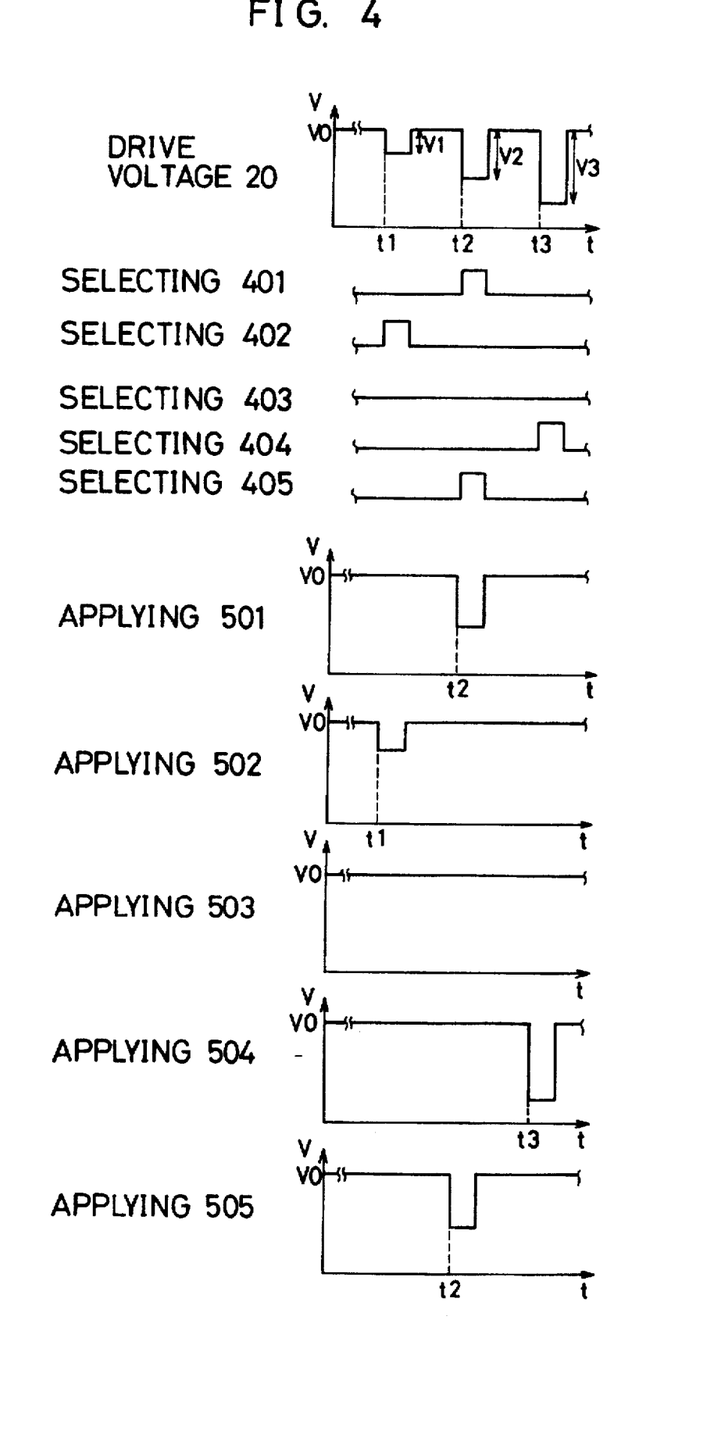
FIG. 4 is a diagram showing a timing relationship between the voltage signal sent from the drive voltage generator, application timing signals sent from application timing selecting portions, and output voltage signals sent from drive voltage applying portions in the first ink ejecting device.

Next, an operation of the ink ejecting device will be described with reference to FIG. 4. FIG. 4 is a diagram showing a timing relationship between the drive voltages generated in the drive voltage generator 20, application timing signals representative of a selected application timing for one of the drive voltages which is selected by the application timing selecting portions 401 to 405, and output voltages outputted from the drive voltage applying portions 501 to 505.

In this case, it is assumed that the image data for the piezoelectric conversion elements 101 to 105 designate as follows: the second density level for the element 101, the third density level for the element 102, the fourth density level for the element 103, the first density level for the element 104, and the second density level for the element 105. The respective image data for the elements 101 to 105 are output in parallel from the image memory 30 to the ink ejecting drive circuit 40.

The application timing selecting portion 401 outputs an application timing signal to select an application timing t2 at which the drive voltage V2 is output from the drive voltage generator 20 so that the intermediate amount of ink is ejected from the ejecting portion provided with the piezoelectric conversion element 101. Upon the application timing t2 being selected, the drive voltage applying portion 501 applies the drive voltage V2 generated in the drive voltage generator 20 to the piezoelectric conversion element 101 at the application timing t2.

The application timing selecting portion 402 outputs an application timing signal to select an application timing t1 at which the drive voltage V1 is output from the drive voltage generator 20 so that the small amount of ink is ejected from the ejecting portion provided with the piezoelectric conversion element 102. Upon the application timing t1 being selected, the drive voltage applying portion 502 applies the drive voltage V1 generated in the drive voltage generator 20 to the piezoelectric conversion element 102 at the application timing t1.

The application timing selecting portion 403 does not output an application timing signal so as not to eject ink through the ejecting portion provided with the piezoelectric conversion element 103. Accordingly, the drive voltage applying portion 503 does not apply any drive voltage to the piezoelectric conversion element 103, and the bias voltage V0 is maintained at the piezoelectric conversion element 103.

The application timing selecting portion 404 outputs a timing, signal to an application timing t3 at which the drive voltage V3 is output from the drive voltage generator 20 so that the large amount of ink is ejected from the ejecting portion provided with the piezoelectric conversion element 104. Upon the application timing t3 being selected, the drive voltage applying portion 504 applies the drive voltage V3 generated in the drive voltage generator 20 to the piezoelectric conversion element 104 at the application timing t3.

The application timing selecting portion 405 outputs an application timing signal to select an application timing t2 at which the drive voltage V2 is output from the drive voltage generator 20 so that the intermediate amount of ink is ejected from the ejecting portion provided with the piezoelectric conversion element 105. Upon the application timing t2 being selected, the drive voltage applying portion 505 applies the drive voltage V2 generated in the drive voltage generator 20 to the piezoelectric conversion element 105 at the application timing t2.

In this way, the amount of ink is controlled merely by changing the ink chamber volume of the ink ejecting portion. The ink chamber volume is changed by deforming the resilient wall. The deformation of the resilient wall is carried out by the piezoelectric conversion element. The piezoelectric conversion element is activated by an electric voltage which is determined in accordance with image data or image density.

Accordingly, an image having a gradation, i.e., a plurality of densities, is printed in quick response to image data. Also, an image having gradations is printed accurately and clearly without deteriorating the resolution of printed image. Further, ink ejecting portions for ejecting the same amount of ink are driven at the same time. Accordingly, the ink ejecting is controlled more simply and quickly.

In the foregoing embodiment, the ink ejecting 10 is arranged with a single array of nozzles. However, it may be appreciated that the ink ejecting is arranged with a plurality arrays of nozzles. In this case, an image memory and a drive circuit are provided for each nozzle array to thereby enable image printing in a larger area at one printing cycle, thereby increasing the printing speed.

Also, a drive voltage generator may be provided for each of a plurality arrays of nozzles. The generating order of drive voltages V1, V2, and V3 of one drive voltage generator is opposite to that of another drive voltage generator, thereby keeping their respective maximum drive voltages V3 from being generated at the same time. Accordingly, the instantaneous power consumption can be efficiently kept at a lower level.

Figure 5:
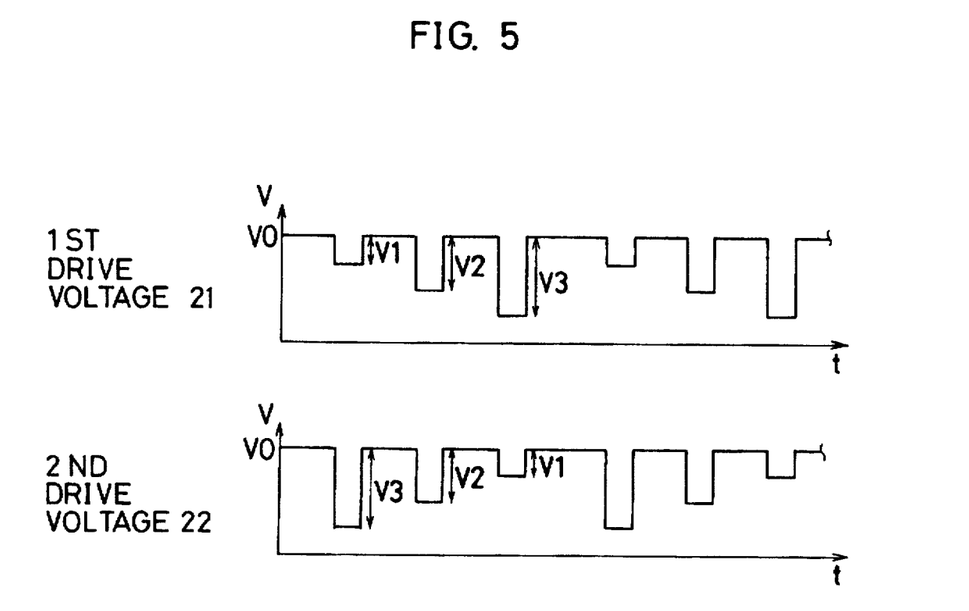
FIG. 5 is a diagram showing a relationship between a voltage signal from a first drive voltage generator and a voltage signal from a second drive voltage generator of a modification of the first ink ejecting device having two nozzle arrays.

Specifically, in the case where the printing head has two nozzle arrays, a first drive voltage generator 21 is provided for one of the two nozzle arrays, and a second drive voltage generator 22 is provided for the other nozzle array, instead of the provision of the drive voltage generator 20 in the foregoing embodiment. As shown in FIG. 5, in the first drive voltage generator 21, the drive voltages V1, V2, and V3 are generated in this order, whereas in the second drive voltage generator 22, the drive voltages V1 to V3 are generated in a reversed order. Accordingly, the instantaneous power consumption can be suppressed at a lower level.

Figure 6:
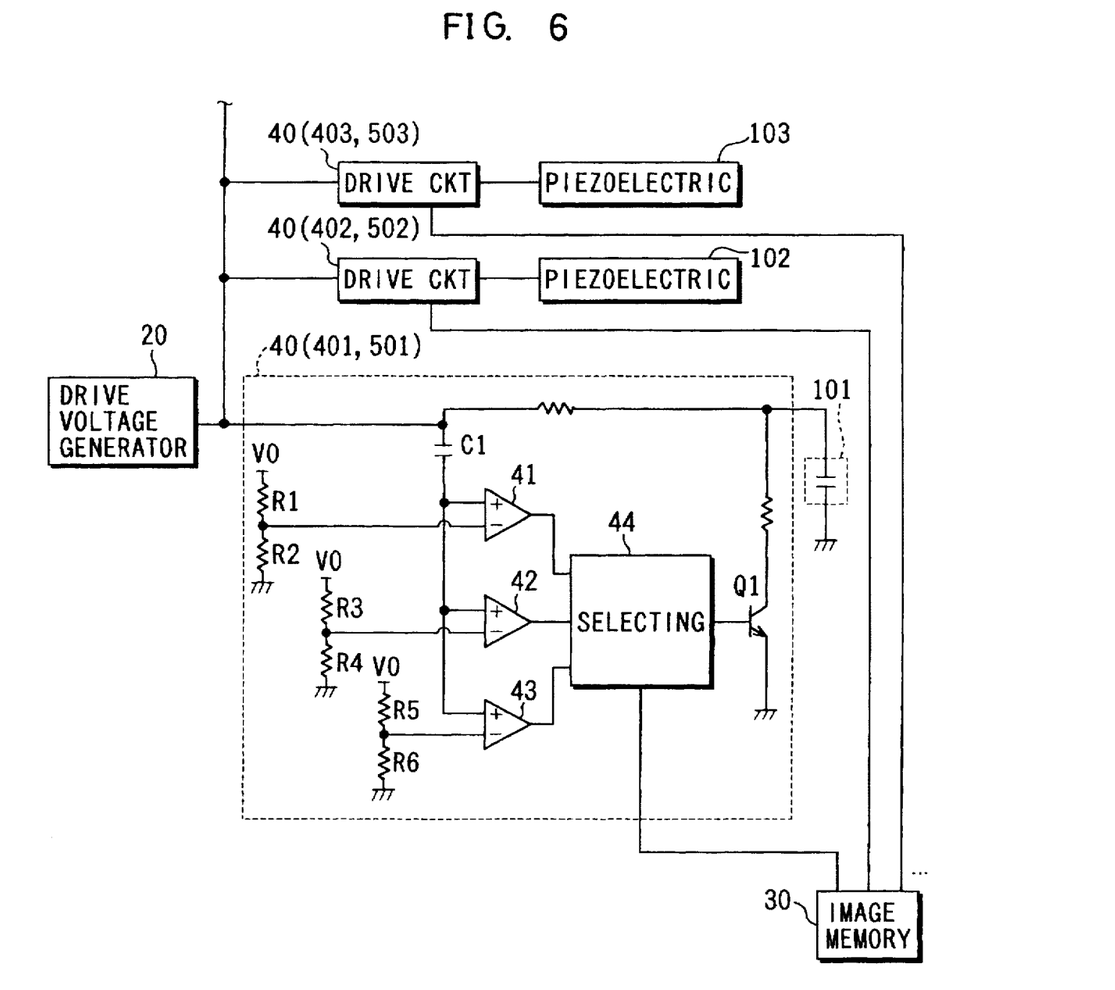
FIG. 6 is a circuit block diagram showing a construction of an ink jet printing apparatus incorporating a second ink ejecting device embodying the present invention.

Next, a second ink ejecting device of the present invention will be described with reference to FIGS. 6 to 8. It should be appreciated that parts of the second ink ejecting device identical to the first ink ejecting device will be indicated at like reference numerals. The second ink ejecting device is different from the first ink ejecting device in that a drive voltage generator 20 generates a bias voltage signal.

An arrangement of the drive voltage generator will be described with reference to FIGS. 6 and 7. FIG. 6 is a circuit block diagram corresponding to FIG. 2 wherein an ink ejecting drive circuit 40 for driving ink ejection of a piezoelectric conversion element 101 is illustrated. It should be appreciated that ink ejecting drive circuits 40 for driving ink ejecting of piezoelectric conversion elements 102, 103, 104, 105, . . . are not illustrated in the drawing since all the ink ejecting drive circuits 40 have the identical circuit arrangement. FIG. 7 is a diagram showing a waveform of a drive voltage signal generated in the drive voltage generator 20.

Figure 7:
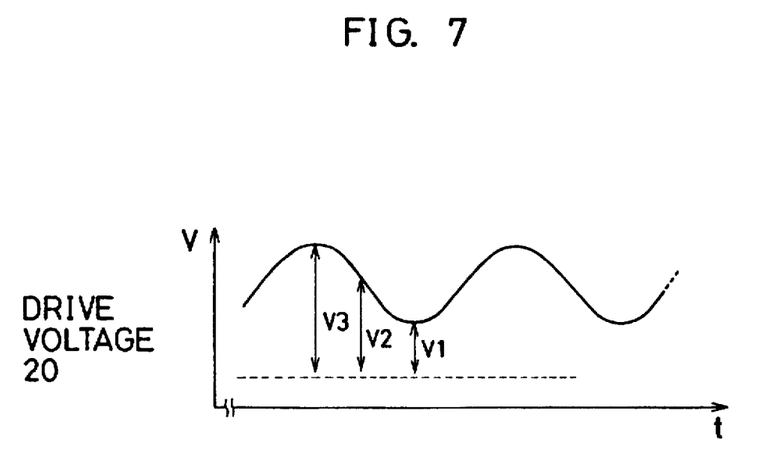
FIG. 7 is a diagram showing a waveform of a voltage signal sent from a drive voltage generator of the second ink ejecting device.
Figure 8:
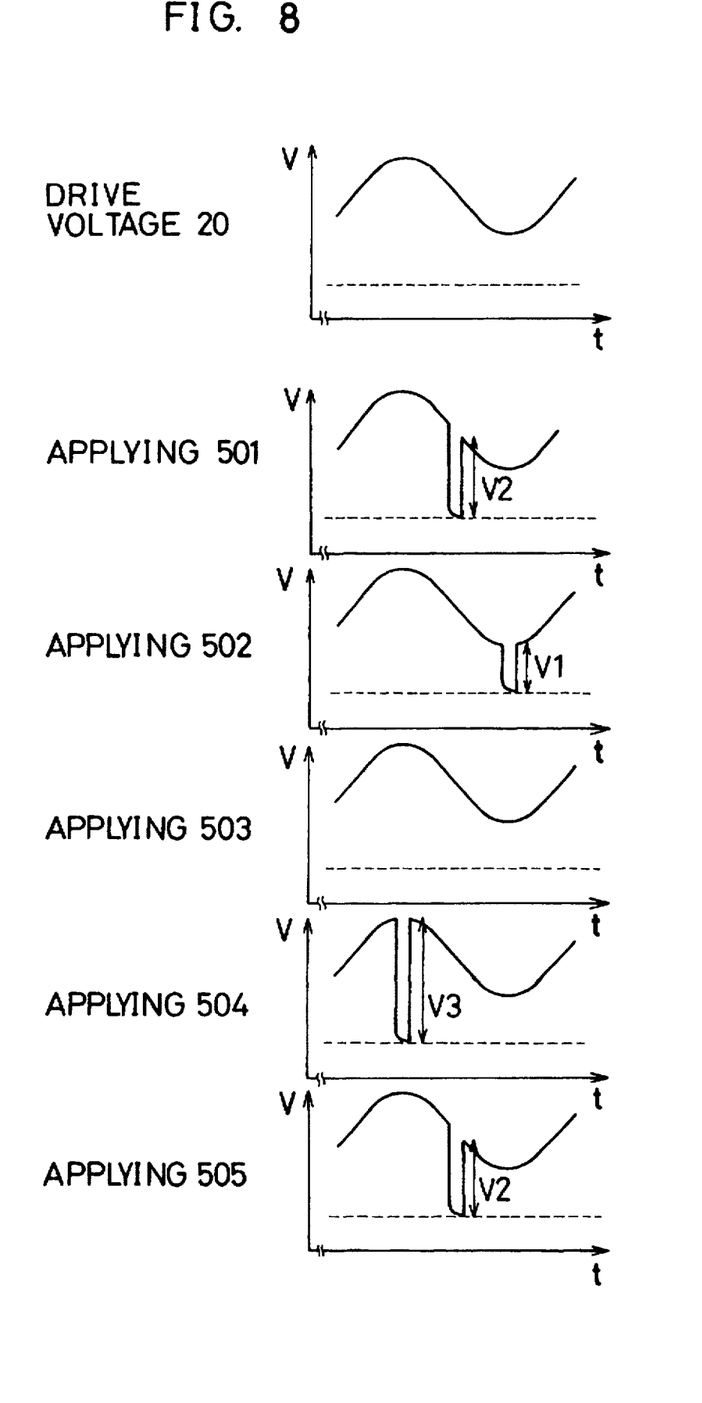
FIG. 8 is a diagram showing a relationship between the voltage signal sent from the drive voltage generator and output voltage signals from drive voltage applying portion in the second ink ejecting device.

In this embodiment, as shown in FIG. 7, the drive voltage generator 20 generates a direct-current drive voltage signal having a sine-wave ripple voltage component. The drive voltage signal is always supplied to the piezoelectric conversion element. The amplitude and frequency of the drive voltage signal is set at such a level that the surface tension of ink keeps ink from ejecting out from the nozzle. It may be possible to use a drive voltage signal having a ripple voltage component in the form of a triangle, a trapezoid, or a sawtooth in place of the sine-wave form.

Image data transmitted from an image memory 30 are outputted in parallel to the corresponding ink ejecting drive circuits 40 in synchronism with the generation of the drive voltage signals in the drive voltage generator 20.

The ink ejecting drive circuit 40 for driving the piezoelectric conversion element 101 comprises comparators 41, 42, and 43, a selecting circuit 44, and a transistor Q1.

The ripple voltage component of the drive voltage signal generated in the drive voltage generator 20 is input to respective non-inverted input terminal of the comparators 41, 42, and 43 via a capacitor C1. A divided voltage obtained by dividing a predetermined voltage V0 by resistors R1 and R2 is input to the non-inverted input terminal of the comparator 41. The comparator 41 outputs a signal of "1" when the drive voltage signal reaches the maximum level. A divided voltage obtained by dividing the predetermined voltage V0 by resistors R3 and R4 is input to the non-inverted input terminal of the comparator 42. The comparator 42 outputs a signal of "1" when the drive voltage signal is at one-half of the maximum level. A divided voltage obtained by dividing the predetermined voltage V0 by resistors R5 and R6 is input to the non-inverted input terminal of the comparator 43. The comparator 43 outputs a signal of "1" when the drive voltage signal is at the minimum level.

The selecting circuit 44 outputs a signal of "1" having a predetermined pulse width in accordance with image data outputted from the image memory 30 to turn the transistor Q1 on. The transistor Q1 has its base connected to an output terminal of the selecting circuit 44, has its collector connected to the piezoelectric conversion element 101 to which a drive voltage is applied, and has its ejector connected to the ground. Upon receiving the signal of "1" having the predetermined pulse width from the selecting circuit 44, the transistor Q1 is turned on. Then, upon a lapse of a specified time period, the transistor Q1 is turned off to apply a drive voltage of a specified level to the piezoelectric conversion element 101.

For example, in the case where a large amount of ink is ejected, the selecting circuit 44 outputs a signal of "1" having a predetermined pulse width to the transistor Q1 upon receipt of the signal of "1" from the comparator 41. Thereupon, the transistor Q1 is turned on to apply the drive voltage V3 to the piezoelectric conversion element. In the case where an intermediate amount of ink is ejected, the selecting circuit 44 outputs a signal of "1" having a predetermined pulse width to the transistor Q1 upon receipt of the signal of "1" from the comparator 42. Thereupon, the transistor Q1 is turned on to apply the drive voltage V2 to the piezoelectric conversion element. In the case where a small amount of ink is ejected, the selecting circuit 44 outputs a signal of "1" having a predetermined pulse width to the transistor Q1 upon receipt of the signal of "1" from the comparator 43. Thereupon, the transistor Q1 is turned on to apply the drive voltage V1 to the piezoelectric conversion element. In the case where no ink is ejected, the selecting circuit 44 does not output a signal of "1", thereby rendering the drive voltage generator 20 output a specified level of output voltage to the piezoelectric conversion element.

Next, an operation of the second ink ejecting device will be described with reference to FIG. 8. FIG. 8 is a waveform diagram showing relationship between the drive voltage signal generated in the drive voltage generator 20 and output voltages from the drive voltage applying portions 501 to 505.

Similar to the first ink ejecting device shown in FIG. 4, the image memory 30 stores image data in the form of a plurality of bits in such a manner that the amount of ink to be ejected through the nozzles corresponding to the piezoelectric conversion elements 101 to 105 is controlled at an intermediate amount, a small amount, nothing, a large amount, and an intermediate amount in this order. These image data are output in parallel from the image memory 30 to the corresponding ink ejecting drive circuits 40.

The transistor Q1 in the ink ejecting drive circuit 40 for driving the ink ejection through the nozzle corresponding to the piezoelectric conversion element 101 is turned on to eject an intermediate amount of ink through the nozzle in accordance with inputted image data. Thereby, the drive voltage V2 is applied to the piezoelectric conversion element 101.

The transistor Q1 in the ink ejecting drive circuit 40 for driving the ink ejection through the nozzle corresponding to the piezoelectric conversion element 102 is turned on so as to eject a small amount of ink through the nozzle in accordance with inputted image data. Thereby, the drive voltage V1 is applied to the piezoelectric conversion element 102.

The transistor Q1 in the ink ejecting drive circuit 40 for driving the ink ejection through the nozzle corresponding to the piezoelectric conversion element 103 is not turned on so as not to eject ink through the nozzle in accordance with inputted image data. Thereby, a drive voltage is not applied to the piezoelectric conversion element 103, and the drive voltage signal generated in the drive voltage generator 20 is applied to the piezoelectric conversion element 103 as the output voltage.

The transistor Q1 in the ink ejecting drive circuit 40 for driving the ink ejection through the nozzle corresponding to the piezoelectric conversion element 104 is turned on so as to eject a large amount of ink through the nozzle in accordance with inputted image data. Thereby, the drive voltage V3 is applied to the piezoelectric conversion element 104.

The transistor Q1 in the ink ejecting drive circuit 40 for driving the ink ejection through the nozzle corresponding to the piezoelectric conversion element 105 is turned on so as to eject an intermediate amount of ink through the nozzle in accordance with inputted image data. Thereby, the drive voltage V2 is applied to the piezoelectric conversion element 105.

Thus, the drive voltage generator 20 always generates a drive voltage signal having an amplitude and a frequency suitable not to eject ink through the nozzles to always apply a specified level of drive voltage to the piezoelectric conversion elements. The transistor Q1 is controlled to be turned on at a specified application timing in accordance with image data. Accordingly, an image having a gradation or a plurality of densities is printed nozzle by nozzle by the present invention having a simplified construction.

Further, a direct-current voltage signal having a ripple voltage component serves as a drive voltage signal for activating ink ejection of piezoelectric conversion elements. Accordingly, the drive voltage can be applied at various levels to piezoelectric conversion elements from a single power source.

Further, the respective resistance values of the resistors R1, R2, R3, R4, R5, and R6 are adjusted to vary the divided voltage which is to be input to the non-inverted input terminals of the comparators 41, 42, and 43. Thereby, the voltage to be applied to the piezoelectric conversion elements is varied easily, and the amount of ink to be ejected is easily adjusted.

Furthermore, a voltage signal having a ripple voltage component is used as drive voltage for piezoelectric conversion elements. Accordingly, a lead end or meniscus of ink contained in a nozzle is vibrated at a constant range in accordance with the ripple voltage component. Accordingly, the high speed ink ejection is maintained.

In the foregoing embodiments, image data has the gradation of four densities, i.e., the first to fourth densities. However, the present invention is not limited to the gradation of four densities but applicable to image data having a gradation of five or more, e.g., first to n-th densities. For example, in the case that image data having a gradation of first to n-th densities is printed in the first embodiment of FIG. 3, drive voltages of (n-1) steps are generated in a specified order. Also, in the case that image data having a gradation of first to n-th densities is printed in the second embodiment of FIG. 6, (n-1) comparators are provided. With these arrangement, effects similar to those of the foregoing embodiments are obtainable.

As mentioned above, the ink jet printing apparatus provided with the ink ejecting device of the present invention as a printing head can accurately print an image having gradations of a plurality of densities at a high speed.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. An ink ejecting device, responsive to an image data generator, the ink ejecting device comprising:
  a plurality of ink ejecting members each having:
    an ink chamber for accommodating ink and a nozzle communicating with said ink chamber through which ink is ejected; and
    an ink ejection actuator including the ink chamber having a wall with at least a portion formed of a resilient member, a piezoelectric element deformable in response to applied voltages, and said piezoelectric element contacting said resilient member for deforming said resilient member to reduce a volume of said ink chamber to eject ink through said nozzle; and
  a controller, responsive to image data indicative of one of a plurality of densities received from the image data generator, for controlling the ink ejection actuator to regulate the volume reduction of the ink chamber in accordance with said image data, the controller including:
    a drive voltage generator for cyclically generating a plurality of different drive voltages corresponding to the plurality of densities in a predetermined order; and
    a drive voltage applicator for selectively applying said drive voltages to the piezoelectric elements in accordance with said image data wherein the plurality of ink ejecting members are divided into at least two groups and the drive voltage applicator applies a first one of said drive voltages to the piezoelectric elements of one of said at least two groups while applying a second one of said drive voltages, different from the first one of said drive voltages, to the piezoelectric elements of another one of said at least two groups to eject ink in response to an image data received from said image data generator.

2. An ink ejecting device as defined claim 1, wherein the drive voltage generator generates said plurality of different drive voltages in the form of a substantially sinusoidal waveform.

3. An ink jet printing apparatus having a printing head in the form of the ink ejecting device as defined in claim 1.

4. An ink ejecting device, responsive to an image data generator, the ink ejecting device comprising:
  a plurality of ink ejecting members each having:
    an ink chamber for accommodating ink and a nozzle communicating with said ink chamber through which ink is ejected; and
    an ink ejection actuator including the ink chamber having a wall with at least a portion formed of a resilient member, a piezoelectric element deformable in response to applied voltages, and said piezoelectric element contacting said resilient member for deforming said resilient member to reduce a volume of said ink chamber to eject ink through said nozzle; and
  a controller, responsive to image data indicative of one of a plurality of densities received from the image data generator, for controlling the ink ejection actuator to regulate the volume reduction of the ink chamber in accordance with said image data, the controller including a drive voltage applicator for selectively applying drive voltages, corresponding to the plurality of densities, to the piezoelectric elements in accordance with said image data wherein the plurality of ink ejecting members are divided into at least two groups and the drive voltage applicator applies a first one of said drive voltages to the piezoelectric elements of one of said at least two groups while applying a second one of said drive voltages, different from the first one of said drive voltages, to the piezoelectric elements of another one of said at least two groups to eject ink in response to an image data received from said image data generator.

5. An ink jet printing apparatus having a printing head in the form of the ink ejecting device as defined in claim 4.

6. An ink ejecting device, responsive to an image data generator, the ink ejecting device comprising:

a plurality of ink ejecting members each having:
   an ink chamber for accommodating ink and a nozzle communicating with said ink chamber through which ink is ejected; and
   an ink ejection actuator responsive to applied voltages for deforming said ink chamber to reduce a volume of said ink chamber to eject ink through said nozzle; and a controller, responsive to image data indicative of one of a plurality of densities received from the image data generator, for controlling the ink ejection actuator to regulate the volume reduction of the ink chamber in accordance with said image data, the controller including a drive voltage applicator for selectively applying drive voltages, corresponding to the plurality of densities, to the ink ejection actuators in accordance with said image data wherein the plurality of ink ejecting members are divided into at least two groups and the drive voltage applicator applies a first one of said drive voltages to the ink ejection actuators of one of said at least two groups while applying a second one of said drive voltages, different from the first one of said drive voltages, to the ink ejection actuators of another one of said at least two groups to eject ink in response to an image data received from said image data generator.

* * * * *